(No Model.) 3 Sheets—Sheet 1.

J. P. DUNN.
CORN HARVESTER AND HUSKER.

No. 448,417. Patented Mar. 17, 1891.

(No Model.) 3 Sheets—Sheet 2.

J. P. DUNN.
CORN HARVESTER AND HUSKER.

No. 448,417. Patented Mar. 17, 1891.

Witnesses
M. Fowler
N. L. Collamer

Inventor
John P. Dunn
By his Attorneys,
C. A. Snow & Co.

(No Model.) 3 Sheets—Sheet 3.

J. P. DUNN.
CORN HARVESTER AND HUSKER.

No. 448,417. Patented Mar. 17, 1891.

Witnesses
M. C. Fowler
N. L. Collamer

Inventor
John P. Dunn
By his Attorneys,
C. A. Snow & Co.

UNITED STATES PATENT OFFICE.

JOHN P. DUNN, OF BEATRICE, NEBRASKA, ASSIGNOR TO J. E. FIELD, FRED LYNDE, S. T. HUEBNER, C. T. WHITE, S. W. WADSWORTH, W. H. STRYKER, FRED DROM, T. H. FITTON, JOHN F. HUNTLING, DAN ALTHEN, W. A. WATSON, AND LEWIS ACHENBACK.

CORN HARVESTER AND HUSKER.

SPECIFICATION forming part of Letters Patent No. 448,417, dated March 17, 1891.

Application filed May 16, 1890. Serial No. 352,002. (No model.)

*To all whom it may concern:*

Be it known that I, JOHN P. DUNN, a citizen of the United States, residing at Beatrice, in the county of Gage and State of Nebraska, have invented a new and useful Corn Harvester and Husker, of which the following is a specification.

This invention relates to corn harvesters and huskers, its object being to effect improvements over a similar device for which United States Letters Patent No. 415,242 were granted to me on the 19th of November, 1889; and it consists in the improved specific construction and combination of devices hereinafter more fully set forth, and illustrated in the accompanying drawings, in which—

Figure 1:
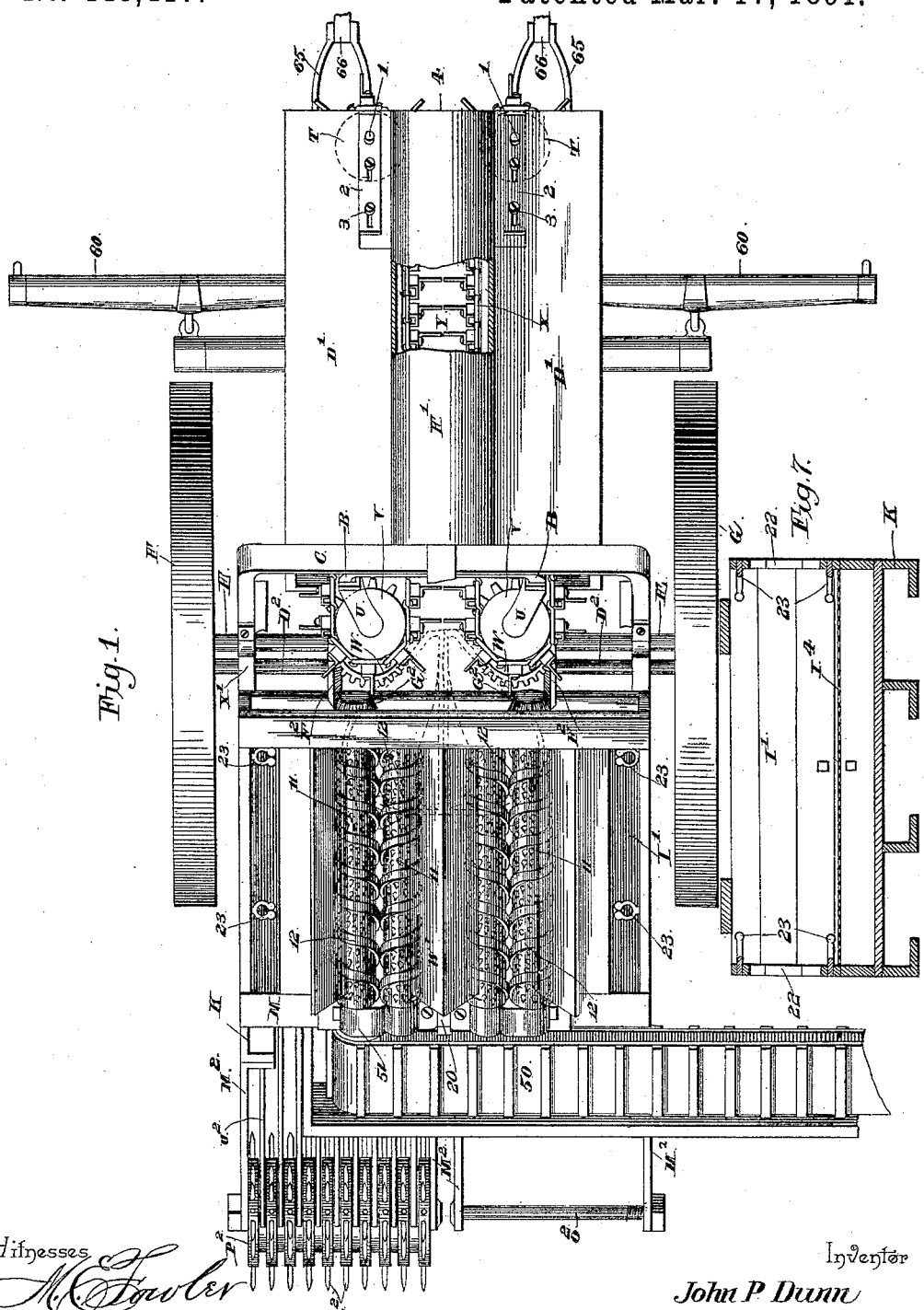
Figure 2:
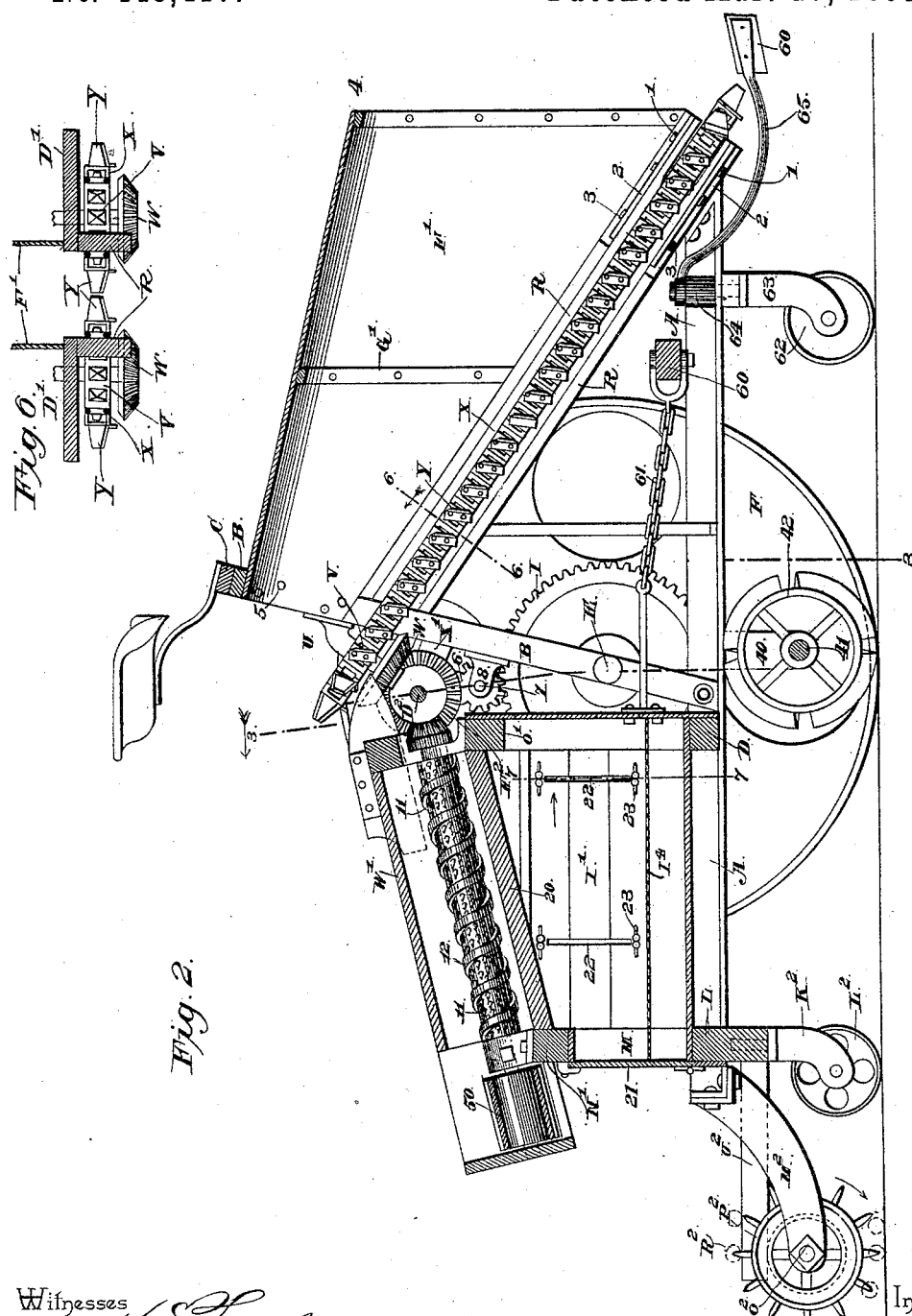
Figure 3:
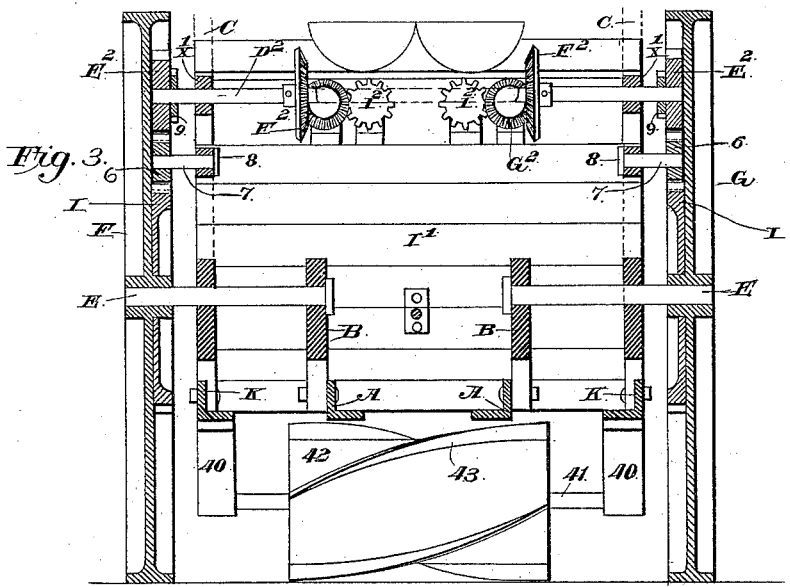
Figure 4:
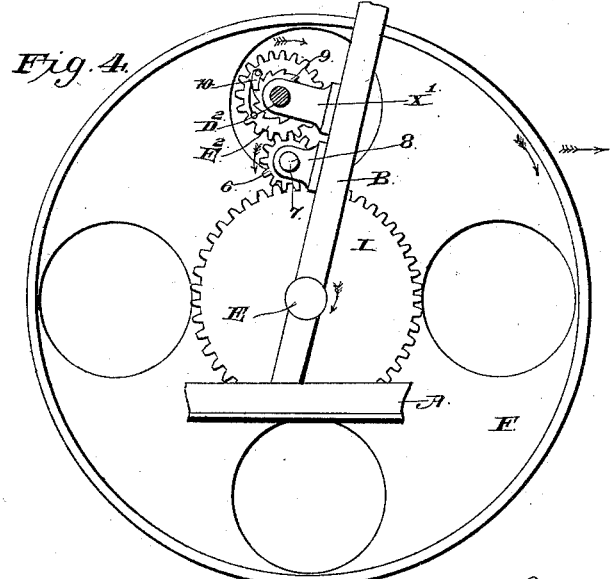
Figure 5:
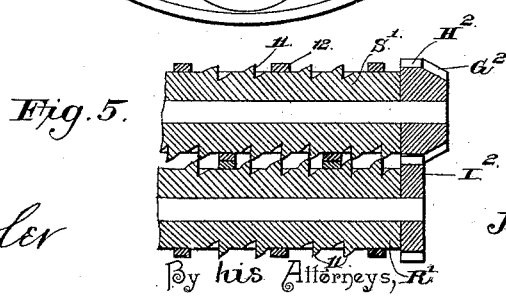

Figure 1 is a plan view of the complete harvester, partly broken away. Fig. 2 is a central longitudinal section thereof. Fig. 3 is a transverse section on the line 3 3 of Fig. 2. Fig. 4 is an elevation of the inside of one of the main driving-wheels, and Fig. 5 is an enlarged longitudinal section through two of the husking-rollers. Fig. 6 is a section on the line 6 6 of Fig. 2, and Fig. 7 is a section on line 7 7 of Fig. 2.

In the said drawings throughout the same letters of reference are applied to the same parts corresponding with similar parts in my previous patent, and reference-numerals are used to designate those parts herein which are improvements upon said patent.

A represents a pair of longitudinal beams, which are arranged under the center of the machine a slight distance apart and are supported at a suitable distance from their front ends by hangers B, which are bolted under the center of an arched axle C. The vertical arms of the latter have their lower ends bolted to a pair of longitudinal beams K, corresponding and parallel with those lettered A and extending from their points of connection with the axle C to the rear end of the machine, said beams A and K being preferably of L shape in cross-section. Transverse beams D connect the four longitudinal beams K, A, A, and K at about the center of the machine, and similar transverse beams L connect them at their rear ends.

M represents an inverted-U-shaped yoke, which has its lower end connected to the rear ends of the outside beams K and to the ends of the cross-beam L.

R represents a pair of inclined beams, which extend from a point slightly below the front ends of the longitudinal beams A to the hangers B near the upper ends of the latter, and in transverse openings near the lower ends of said beams are mounted sprocket-wheels T, whose shafts 1 are journaled in plates 2, which are adjustable by means of screws and slots 3, as best seen in Fig. 1. On the rear sides of the hangers B, near the upper ends thereof, are brackets U, which are provided with downwardly-extending spindles arranged at right angles to the beams R, and on said spindles are journaled sprocket-wheels V and miter gear-wheels W, said sprocket-wheels being rigidly secured to the said miter-wheels or formed integral therewith, as preferred. Passing around the sprocket-wheels V and T are two chains X, from the outer side of the links of which project cutter-plates Y, these cutter-plates being so attached to the links that the plates will stand in a vertical plane on the upwardly-moving sides of the endless chains X. Shield-plates D' cover the outwardly-projecting cutter-plates Y, and extend from the sides of the machine inwardly to a central hood F', that arches the space between such plates and extends from a point 4 above the front end of the machine back to the hangers B, with which it is connected by bolts 5, as shown in Fig. 2.

G' represents a U-shaped brace-strap that extends upwardly from the beams A, and has its upper bowed end arranged under the hood, whereby the latter is supported firmly at its center.

Upon the vertical arms of the arched axle C are mounted bearings X', in which is journaled a transverse shaft $D^2$, carrying gears $E^2$ at their outer ends, which gears are loosely mounted on said shaft and have ratchet-wheels 9 alongside thereof keyed to the shaft. These gear-wheels also have spring-actuated pawls 10 engaging said ratchet-wheels, whereby the gears will turn the shaft if they are turned in one direction, but not if in the other direction. 6 is an idle-gear mounted on a stub-shaft 7, which is journaled in a bracket 8, also carried by the vertical arm of said arched axle C, and this idle-gear communicates motion to the said gear $E^2$ from a large gear I, keyed to the spindle E, which carries each of the main driving and supporting wheels F G. This spindle is journaled in the arched axle C and in the hanger B at each side of the machine, as shown in Fig. 3. It will thus be seen that when one of these main wheels is backed the pawl 10 will slip over the ratchet 9 and a reverse rotation will not be communicated to the shaft $D^2$.

Upon the shaft $D^2$ are two beveled gears $F^2$, which intermesh with the above-mentioned miter gear-wheels W, whereby motion is communicated to the chains X, as will be readily understood. In my former patent I provided an independent shaft for driving the husking-rollers R' and S'; but in the present case I propose to drive these rollers from the same shaft $D^2$ which drives the chains X. The said beveled gear $F^2$ meshes with a miter-wheel $G^2$, formed upon or constituting part of a gear-wheel $H^2$, said gear-wheel being fast to the shaft of a roller S', and also intermeshing with another gear $I^2$, which is fast upon a second roller R', all as best seen in Fig. 5. Each of the rollers R' and S' in the present instance is made, preferably, of steel, with rasp-like points 11 projecting from their faces, and each roller is also surrounded by a strip of rubber 12, applied spirally to said roller and secured to the face thereof in any suitable manner, the rubber being slightly thicker than the length of said points 11, as shown.

N' and O' are cross-beams connected by a beam 20, which extends longitudinally across the top of a box I', inclosed at its sides and ends and having a gate or door 21 at its rear, which box stands below each pair of rollers R'S' and receives the husks as they are drawn from the ears of corn.

$I^4$ is a screen forming the bottom of this box, whereby dust and dirt may fall therethrough, as will be obvious. In the sides of this box are formed vertical grooves or slots 22, at each extreme of which is located a spring-clip 23, as shown, and cords are stretched across the top and bottom of the box between the spring-clips and led out through the slots 22, which cords, after the box has been filled with husks, are drawn tight and tied, thereby bundling or baling the husks in a manner which will be well understood.

Arranged below the box I' and under the beam L are swiveled frames $K^2$, provided with supporting-rollers $L^2$, which bear upon the ground and support the rear end of the machine.

Extending rearwardly from the beams K and A are arms $M^2$, between the outer ends of which are shafts $O^2$, and on these shafts are journaled drums $P^2$, which are provided with radial spurs $R^2$, that almost touch the ground as the machine progresses. In the event that any of the ears of corn should fall to the ground when they are severed from the stalk they will be picked up by the spurs $R^2$ of the trailing drum $P^2$, and as the latter is caused to rotate in picking up other ears the ears already picked up will be carried to the upper side of the drum and will be dropped upon clearer-bars $U^2$ in the same manner as in my former patent and can be removed from said clearer-bars by hand or otherwise.

Beneath the frame-work of the machine and between the two main wheels F and G in suitable brackets 40 is mounted a shaft 41, carrying a drum 42, and upon the face of this drum are arranged spiral knives 43. The function of this drum and its knives is to press the stalks tightly to the ground and cut them into small pieces after the ears have been torn off. The stripping of the ears from the stalk occurs at the front end of the machine and is performed by the knives Y on the chain X in the same manner as in my former patent, after which the stalks, which have been depressed or broken down by the machine, are chopped or cut into pieces by this cutter-drum in a manner which will be obvious. As the ears are stripped from the stalks and are delivered from the upper and rear ends of the chains X they fall upon the deflecting-shield W', by which they are carried to either pair of rollers R' S', and after these rollers have torn the husks from them the ears are passed down the rollers to the rear and onto a laterally-traveling belt 50, driven by a wheel mounted on an extension 51 of one of the roller-shafts, which belt may be employed for this purpose, if desired.

In my former patent I employed whiffle-trees connected directly to the frame-work of the machine; but experience has taught me that if the horses do not travel exactly between the rows of corn or if the draft were unequal the machine would not travel so that the corn would be guided directly into the open end of the hood F', and in order to overcome this difficulty I attach the whiffletree 60 by chains 61 to the frame-work, in order that the draft will be flexibly connected therewith. In addition, I provide wheels 62, mounted in brackets 63, which are swiveled, as at 64, in the frame-work, and projecting forwardly from the heads of these brackets are bars 65, between the front ends of which are tongues 66, extending forwardly between the two horses and connected to their heads, the tongues being such a distance apart that the row of corn may pass between them as the machine progresses.

The operation of this machine is thought to be obvious.

What I claim is—

1. In a corn-harvester, the combination, with the frame-work and the stripping mechanism carried thereby, of brackets swiveled in said frame-work at each side of the stripping mechanism, wheels journaled in said brackets and bearing on the ground, bars extending forwardly from said brackets, tongues connected to said bars, and whiffletrees, also connected to the frame-work, substantially as described.

2. In a corn-harvester, the combination, with a rotating shaft carrying beveled gear-wheels approximately above the center of the machine, of stripping-belts carrying knives traveling upon rollers journaled in the frame-work, gear-wheels upon the rear rollers meshing with said beveled gear-wheels, husking-rollers journaled in the frame-work in rear of said shaft, and gear-wheels on said rollers, also meshing with said beveled gear-wheels, substantially as described.

3. In a corn-harvester, the combination, with the stripping and husking mechanisms and means for driving them, of a box below the husking mechanism having vertical slots in its sides, spring-clips at the ends of said slots, and a door at the rear end of said box, as and for the purpose set forth.

4. In a corn-harvester, the combination, with the inclined beams R of the frame-work, the brackets U, pulleys V thereon, plates 2, adjustably connected by slots and set-screws 3 to said beams, shafts 1 between said plates, wheels T on said shafts, and stripping-chains passing around said wheels V and T, of husking-rollers R' S', journaled in the frame-work in rear of the stripping mechanism, a rotating shaft $D^2$, having beveled gears $F^2$, driving both the stripping and husking mechanisms, a pulley on the extended end 51 of one of the husking-rollers, and a laterally-traveling belt 50, passing around said pulley, substantially as described.

5. In a corn-harvester, the combination, with the spindles, the main wheels journaled thereon, the gear-wheels connected to said main wheels, stub-shafts journaled in the frame, idle-gears thereon meshing with said gears on the main wheels, a shaft journaled in the frame and carrying ratchet-wheels, and gear-wheels journaled on said shaft, meshing with said idle-wheels and carrying pawls normally engaging said ratchet-wheels, in combination with stripping mechanism, husking mechanism, and delivering mechanism driven by said shaft, all as and for the purpose hereinbefore set forth.

In testimony that I claim the foregoing as my own I have hereto affixed my signature in presence of two witnesses.

JOHN P. DUNN.

Witnesses:
W. V. A. DODDS,
R. S. BIBB.